Figure 1:
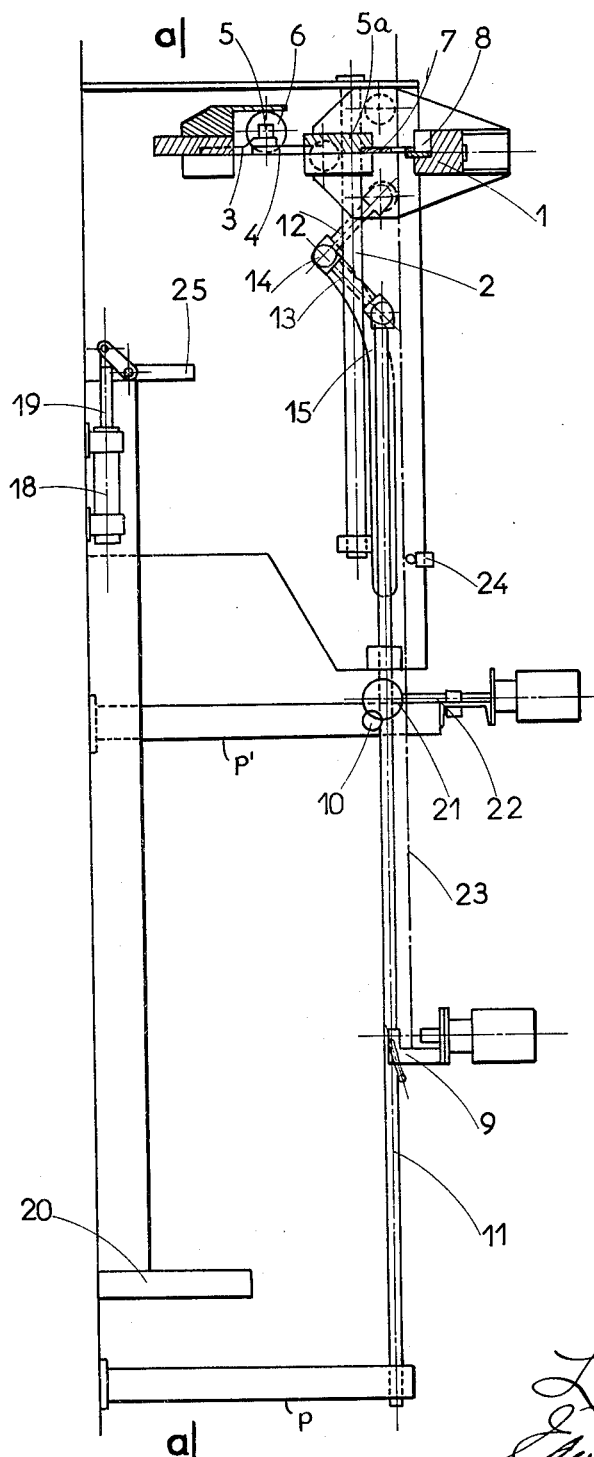

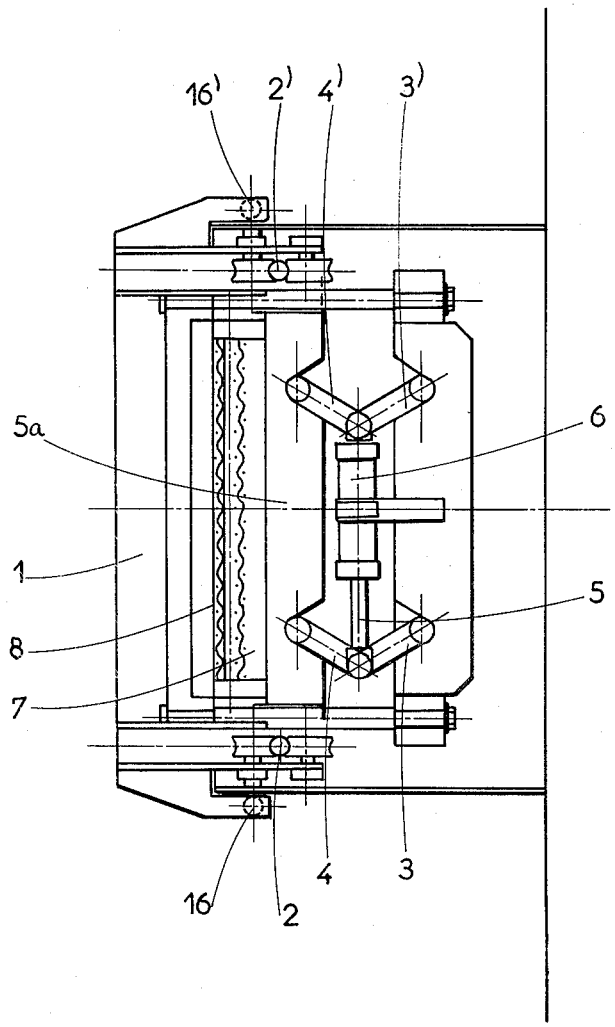

United States Patent Office 3,211,037
Patented Oct. 12, 1965

3,211,037
FLYING CUTTER WITH CAMWAY CONTROLLED
ACTUATING MEANS
Lucien Diolot, Neuilly-sur-Seine, France, assignor to
Societe Nouvelle Spidem, Paris, France
Filed Aug. 2, 1963, Ser. No. 299,536
6 Claims. (Cl. 83—320)

This invention relates to a cutting device for metal sheets or plates. Sheets of relatively great width intended to be converted into corrugated sheets or sheets of any other profile in roller machines of known type are cut to length before being introduced into the machine.

Owing to the fact that the front end of the sheet approaches each row of rollers without any deformation having been previously imparted thereto, while the deformations in the running part are made progressively, the deformation is not absolutely uniform and it can be seen that after leaving the machine, the front end of the formed sheet has not exactly the same width as the rear end, which is incompatible with the increasing requirements for precision as regards use of the sheets, more particularly in their application to the construction of buildings when they have to be connected to materials having the same profile.

There are known flying shears for plane sheets and their principle could be applied to the design of analogous machines for corrugated or shaped sheets. But this type of machine is heavy and expensive when its operation is rapid and cannot be used when it is slow, owing to the longitudinal deformation it causes to the sheet (hog-backed elongation) during cutting with fixed shears.

The present invention makes it possible to remedy these disadvantages by feeding the sheet continuously after shaping. It has as its principal object an automatic cutting device for corrugated or profiled sheets travelling continuously, characterized by the fact that the cutting tool is supported by a movable carriage, the movement of which is produced by that of the sheet, by way of a progressive starting system, which is brought about by a double linkage, the two central points of articulation of which are compelled to move through two rollers on two cams, the profile of which is calculated so that the movement of the sheet imparts to the carriage supporting the cutting tool a uniformly accelerated movement, thus bringing it up to a speed equal to that of travel of the sheet, that is to say without stopping the shaping machine or the sheet. The device according to the invention has the additional advantage of being able to start from heavy coils coming directly from the rolling mill and of using the shaping machine in an absolutely continuous manner during the unwinding of one coil, whereas the sheet by sheet method requires unstacking and necessarily involves a dead period, however small, between the completion of one sheet and the introduction of the next.

The fact that the corrugated or shaped sheet has a much greater inertia moment than a flat sheet of same width, makes it possible to design a machine at least of equal precision and of much greater simplicity and hence of considerably reduced cost.

Figure 2:
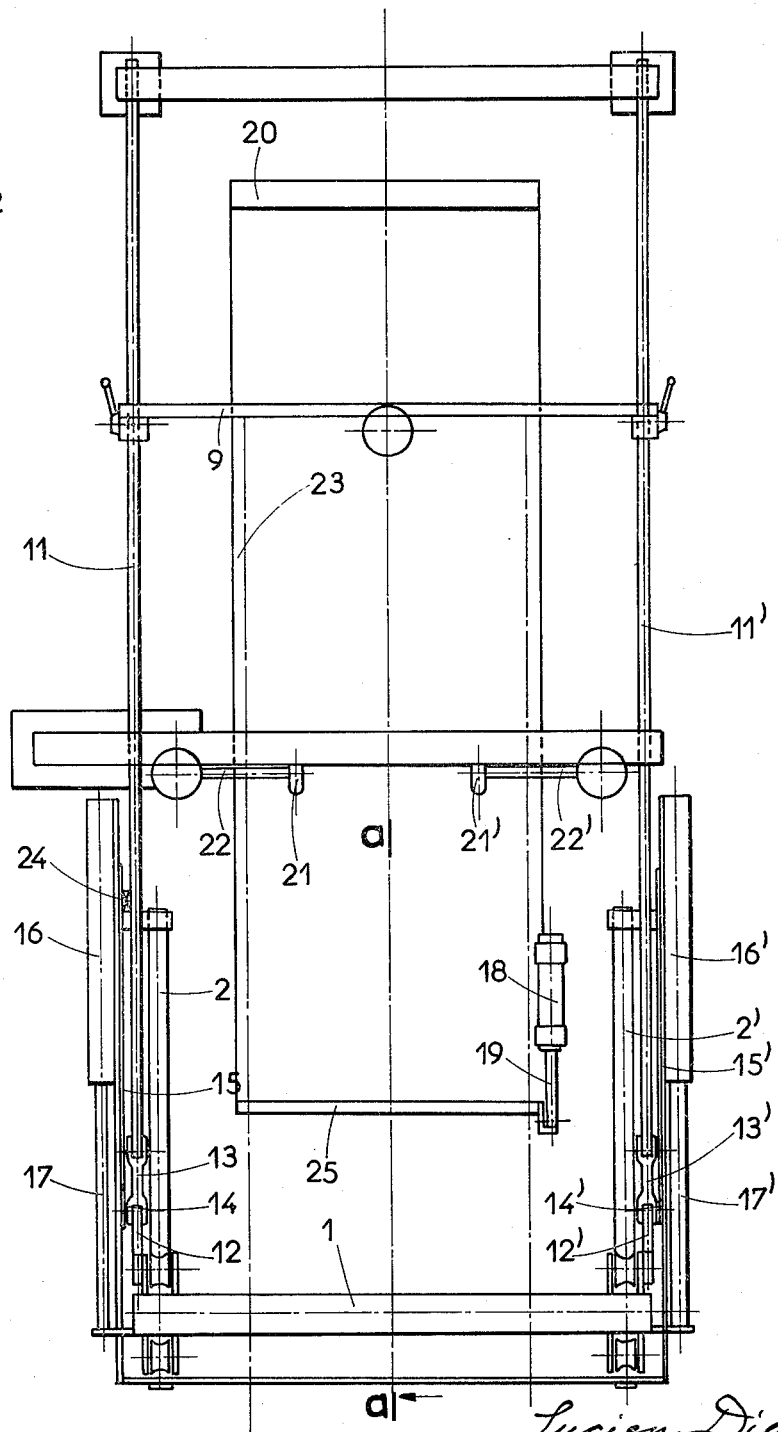
Figure 3:
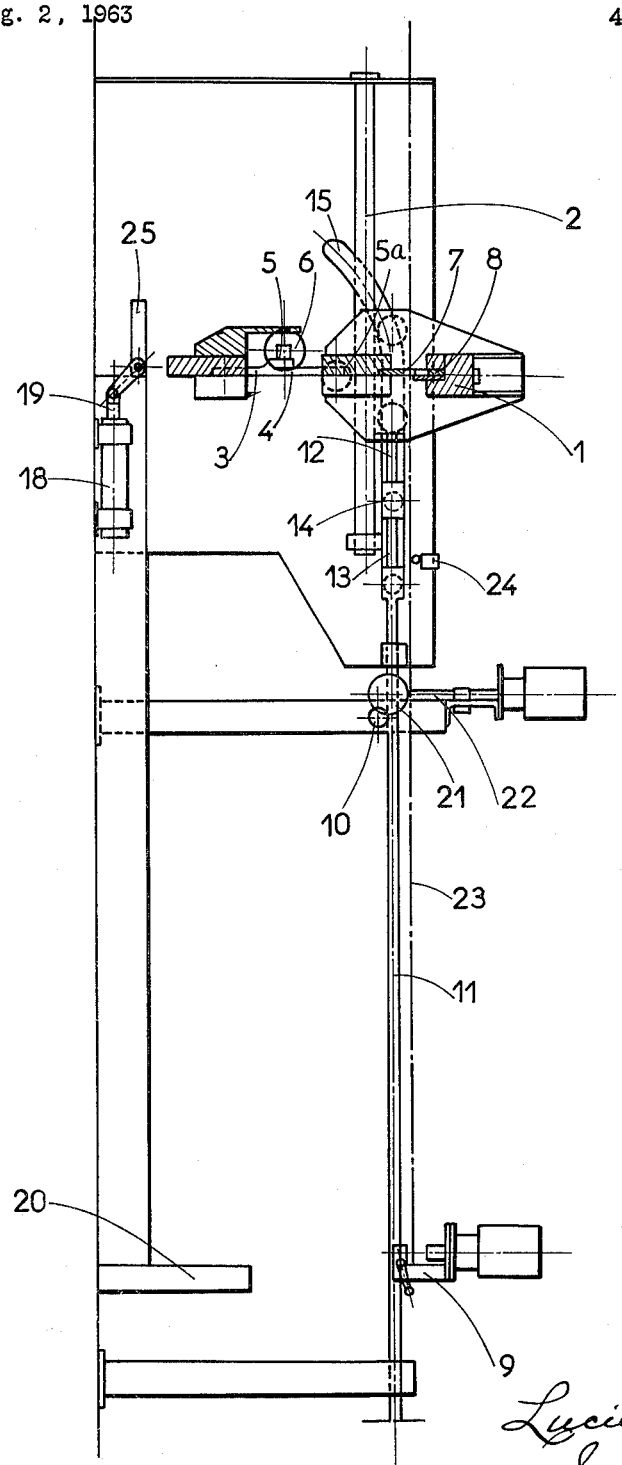

One preferred embodiment, to which the invention is not intended to be restricted, will be described hereunder with reference to the accompanying drawings, in which:

FIGURE 1 is a longitudinal view of the mechanism at rest.
FIG. 2 is a plan view of the mechanism at rest.
FIGURE 3 is a longitudinal view of the system at the moment of cutting.
FIG. 4 is a profile view of the shears at rest.

A transversely extending shearing element denoted generally as 1, which is light in weight, is carried at its opposite side edges in a supporting frame and adapted to move on parallel spacedly arranged tubular supports 2–2'. In the arrangement of the shearing elements shown, the blade 7 is actuated by paired toggle means 3, 4 and 3', 4' by means of a power cylinder 6 from the position shown in FIG. 4 through a complete cutting cycle whereupon they are disposed toward the right hand side of the machine (as viewed from the front thereof in FIG. 4). The upper ends of the paired toggle means are fixed to the vertically sliding frame 5a and actuated by the pneumatic means 6. The compressor means and its associated lines for furnishing power to this hydraulic means being familiar to those skilled in the art are not shown. Thus, it will be understood that for each transverse movement of the piston rod 5 the lower blade carries out one complete cutting cycle and provides an extremely rapid and short stroke of the lower shearing element. The severing edges of the blades 7 and 8 may have planar face portions adapted to cut flat sheets or may be profiled to correspond to the shape of any other type of which it is desired to cut.

A stop 9 is adjustably attached to two horizontally disposed rods 11–11' which are slidably and longitudinally supported at their free ends by upstanding posts P and substantially intermediate their length by rollers 10–10' which are supported in a manner that will be described in detail later. The opposite ends of the rods 11–11' are associated with the shearing elements by means of a carriage which comprises diametrically opposed pairs of linkages including pivotally joined levers 12, 13 and 12', 13', respectively. Intermediate each of the levers are mounted rollers 14–14', each of which is arranged to traverse camways 15–15', respectively. The hydraulic cylinders 16–16' are adapted through the medium of their arm portions 17–17' to reciprocate the shearing elements longitudinally of the supporting means therefor.

As best illustrated in the top plan view of FIG. 2, there is positioned between and beneath the support means for the cutting device an elongated base portion for a purpose now to be described. At the rear of the base is positioned an upstanding backstop or aligning means 20. Adjacent to the opposite end of said base and carried at one longitudinal edge thereof is a hydraulic cylinder 18, provided with a reciprocable arm 19, the free end of which supports an L-shaped lever which, in turn, pivotally supports a plate 25 which may be moved through an arcuate path of approximately 90° to joggle a plate against the backstop 20 when they drop onto the base from the severing mechanism.

An upstanding post P' disposed substantially medially of one side of the machine (FIG. 2) is provided with a horizontally extending arm arranged to support in spaced arrangement suitable power means to which are pivotally secured arms 22–22'. To the free ends of arms 22–22' there are revolubly secured roller means 21–21' on which the sheet of metal is supported as it advances into the cutting machine. After the leading edge of the sheet abuts the stop means 9, a sequence of events now to be described is initiated, resulting in the sheet being severed to length and dropped upon the aligning means.

*Operation*

For a more clear understanding of the sequence of events which take place as the finished sheet leaves the shaping machine, it is to be noted that the severing machine is in the position shown in FIG. 1 and the plane of the sheet which has already been introduced through the cutting blades 7 and 8 is now in abutting relation with the stop means 9. This means being adjustably secured to the rod means 11—11' moves therewith to the right as viewed in FIG. 1.

As pointed out in the detailed description hereinbefore, the rod members 11—11' are secured to a carriage comprising articulated linkage means, the generally longitudinal end portions 12—12' of which are pivotally secured to the frame of the reciprocable cutting means. As soon as the rapidly advancing sheet contacts stop means 9 and moves it and the rod means 11—11' quickly to the position shown in FIG. 3, the linkage is caused to assume the position shown in FIG. 3.

It is well to digress for a moment before explaining the sequential steps which follow to point out the significance of the linkage arrangement which is associated with the rod means 11—11' and the reciprocably mounted shearing means.

Referring once again to FIG. 1, it is to be observed that the shearing means is in a position of rest at the far left of the supporting means 2—2' (FIG. 1), the linkage is positioned at an angle thereto with the rollers 14—14' confined in the lower forward extremities of the opposed camways 15—15'. With this arrangement of elements it is possible to move the shearing mechanism progressively from zero speed up to the speed of travel of the inwardly advancing sheet of metal without placing any undue stress on the thinnest type of sheet which is to be severed to length. Thus, with the benefit of this organization of elements, the profile of the camway and its cooperating linkage means, the shearing mechanism can be uniformly and progressively accelerated.

Accordingly, as the carriage and its associated linkage elements attain the position shown in FIG. 3, a trigger means 24 secured to camway 15 is contacted by a portion of the linkage means thereby initiating the sequence of events which take place successively to bring about the cutting operation. Thereafter, the shearing mechanism is caused to return to its position of rest and rollers 21—21' are swung downwardly and away from the contour of the sheet so that the severed sheet may drop to the stacking means. The joggling device 25 is raised from the position shown in FIG. 3 to that of FIG. 1 to uniformly align this sheet with those previously dropped on the base.

As the sheet falls to the base, the rollers 21—21' are once again returned from their retracted position to their horizontal position to receive the next incoming sheet which begins to travel through the cutting blades 7 and 8 preparatory to the next succeeding cycle of operation.

Although only one embodiment of the invention has been depicted and described, it will be apparent that this embodiment is illustrative in nature and that a number of other modifications in the apparatus and variations in its end use may be effected without departing from the spirit or scope of the invention as defined in the appended claims.

I claim:

1. In a device adapted for continuously severing horizontally traveling sheets of predetermined length from advancing stock which is introduced between spaced cutting means carried thereby, the combination comprising spacedly arranged upstanding means adapted to support diametrically and horizontally opposed support means, a frame means arranged for reciprocable movement on said support means, cutting means carried by said frame means, means carried by said frame means and adapted to travel therewith for actuating said cutting means, parallel spacedly arranged horizontally disposed reciprocable rod means carried by said upstanding means, linkage means associating said frame means with said reciprocable rod means, means carried by said last named means adapted to be driven by the advancing stock for imparting movement to said linkage means to cause the cutting means to advance with said sheet and sever a length thereof from the moving stock and means immovably secured with respect to said linkage means and adapted to be triggered by movement thereof to energize said actuating means of said cutting means.

2. In a device adapted for continuously severing horizontally traveling sheets of predetermined length from advancing stock which is introduced between spaced cutting means carried thereby, the combination comprising spacedly arranged upstanding means adapted to support diametrically and horizontally opposed support means, a frame means arranged for reciprocable movement on said support means, cutting means carried by said frame means, means carried by said frame means and adapted to travel therewith for actuating said cutting means, parallel spacedly arranged horizontally disposed reciprocable rod means carried by said upstanding means, linkage means associating said frame means with said reciprocable rod means, means carried by said last named means adapted to be driven by the advancing stock for imparting movement to said linkage means, camway means for controlling the path of travel of said linkage means to cause said cutting means to advance with progressive speed in the direction of travel of said sheet and means adapted to energize said actuating means of said cutting means to sever a length of said sheet from the moving stock when the speeds of travel of said cutting means and said sheet are substantially equal.

3. In a device as defined in claim 2, wherein said linkage means include levers interconnected by a pivotal joint, the free ends of said levers being secured to said rod means and to said frame means and complementally formed camway means for guiding said pivotal joint in a curved path.

4. In a device adapted for continuously severing horizontally traveling sheets of predetermined length from advancing stock which is introduced between spaced cutting means carried thereby, the combination comprising spacedly arranged upstanding means adapted to support diametrically and horizontally opposed support means, a frame means arranged for reciprocable movement on said support means, cutting means carried by said frame means, means carried by said frame means and adapted to travel therewith for actuating said cutting means, parallel spacedly arranged horizontally disposed reciprocable rod means carried by said upstanding means, linkage means associating said frame means with said reciprocable rod means, means carried by said last named means adapted to be driven by the advancing stock for imparting movement to said linkage means to cause the cutting means to advance with said sheet and a sever a length thereof from the moving stock and means for supporting said advancing stock, said last named means adapted to be retracted from a position of supporting said sheet to a position beyond the contour thereof to permit a displacement of said severed length of sheet in a direction substantially normal to the plane thereof.

5. In a device as defined in claim 4, wherein joggling means are positioned within the confines of said spacedly arranged upstanding means, said joggling means being adapted to receive the severed length of sheet from said means for supporting said advancing stock and thereupon align said severed length of sheet sequentially together with previously delivered sheets into a uniform stack.

6. In a device as defined in claim 4, wherein said means for supporting said advancing stock includes roller means pivotally secured to said upstanding means and adapted to be swung from a position of supporting said sheet to a position beyond the contour thereof to permit a displacement of said severed length of sheet in a direction substantially normal to the plane thereof.

References Cited by the Examiner

UNITED STATES PATENTS

| | | | |
|---|---|---|---|
| 1,608,503 | 11/26 | Harding | 83—626 |
| 1,625,850 | 4/27 | Gedien et al. | 83—318 X |
| 1,944,718 | 1/34 | Rafter | 83—293 |
| 2,341,021 | 2/44 | Curtis | 271—89 |
| 2,603,291 | 7/52 | Williams | 83—157 |
| 2,933,966 | 4/60 | Dehn | 83—157 X |

WILLIAM W. DYER, JR., *Primary Examiner.*

LEON PEAR, ANDREW R. JUHASZ, *Examiners.*